(12) United States Patent
Bucheton et al.

(10) Patent No.: US 7,802,488 B2
(45) Date of Patent: Sep. 28, 2010

(54) TELESCOPIC ACTUATOR WITH A MAIN ROD AND AN AUXILIARY ROD, AND A METHOD MAKING USE THEREOF

(75) Inventors: Daniel Bucheton, Le Chesnay (FR); Hervé Charuel, Nozay (FR)

(73) Assignee: Messier-Bugatti, Velizy Villacoublay (FR)

(*) Notice: Subject to any disclaimer, the term of this patent is extended or adjusted under 35 U.S.C. 154(b) by 334 days.

(21) Appl. No.: 11/641,812

(22) Filed: Dec. 20, 2006

(65) Prior Publication Data

US 2007/0144846 A1 Jun. 28, 2007

(30) Foreign Application Priority Data

Dec. 23, 2005 (FR) ................... 05 13298
May 16, 2006 (FR) ................... 06 04353

(51) Int. Cl.
*F16H 29/20* (2006.01)
(52) U.S. Cl. .................... 74/89.23; 74/89.26
(58) Field of Classification Search ........ 74/89.23, 74/89.26, 89.28, 89.34, 89.35, 89.38, 89.25, 74/89.29; 91/41–49, 173; 92/15–20, 21 R, 92/21 MR, 22–28, 51–53, 108, 110; 384/25, 384/38, 495
See application file for complete search history.

(56) References Cited

U.S. PATENT DOCUMENTS 3,603,207 A * 9/1971 Parrett ..................... 91/167 R
4,024,800 A * 5/1977 Masclet .................... 92/26
4,075,929 A * 2/1978 Peterson ................... 91/168
4,457,212 A * 7/1984 Unger et al. ............... 92/18
4,745,815 A * 5/1988 Klopfenstein ............. 74/89.25
4,876,906 A * 10/1989 Jones ...................... 74/89.25
5,092,539 A * 3/1992 Caero ...................... 244/99.9
5,144,851 A * 9/1992 Grimm et al. ............. 74/89.26
5,313,852 A * 5/1994 Arena ..................... 74/89.35
5,599,167 A * 2/1997 Daldosso .................. 416/108
5,848,554 A * 12/1998 Kober et al. .............. 74/89.35
6,247,667 B1 * 6/2001 Fenny et al. ............... 244/7 R

FOREIGN PATENT DOCUMENTS

| BE | 476 907 A | 11/1947 |
| DE | 33 08 537 C1 | 10/1984 |
| GF | 2 272 205 A | 5/1994 |
| WO | WO 83/02141 A | 6/1983 |
| WO | WO 91/05698 A | 5/1991 |
| WO | WO 2004/113707 A | 12/2004 |

* cited by examiner

*Primary Examiner*—Thomas R Hannon
*Assistant Examiner*—Phillip A Johnson
(74) *Attorney, Agent, or Firm*—Sughrue Mion, PLLC

(57) ABSTRACT

The invention relates to a telescopic actuator comprising a cylinder in which a main rod is mounted to slide telescopically along a sliding axis between a retracted position and an extended position. The actuator includes an auxiliary rod mounted to slide telescopically in the main rod along said sliding axis between a retracted position and an extended position, the actuator including controlled retaining means for retaining the auxiliary rod in the retracted position inside the main rod.

17 Claims, 6 Drawing Sheets

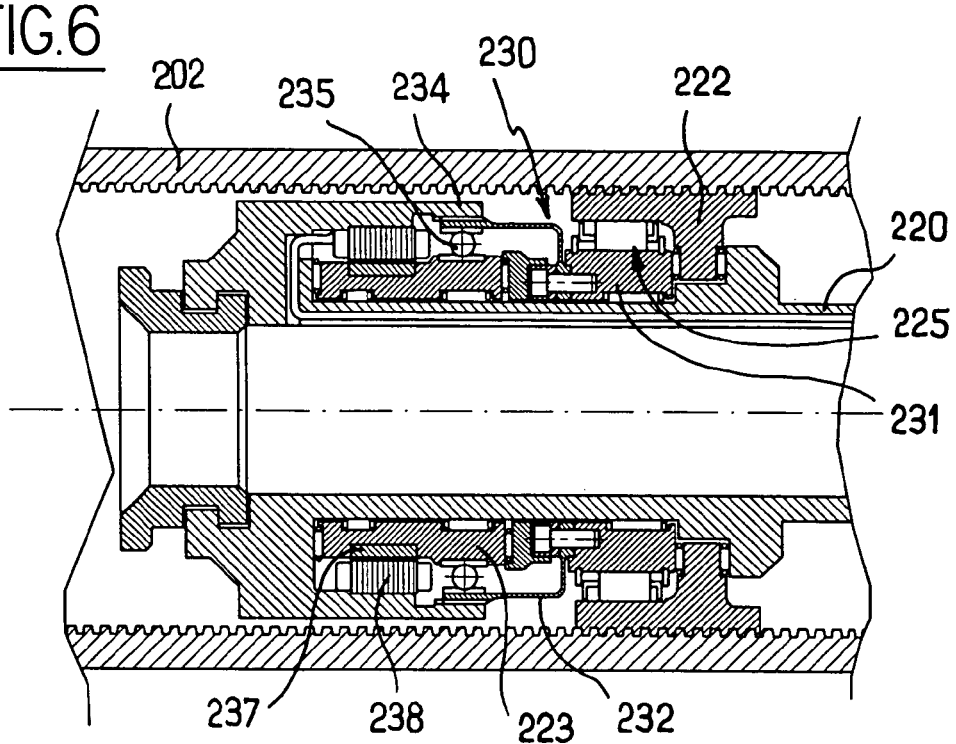
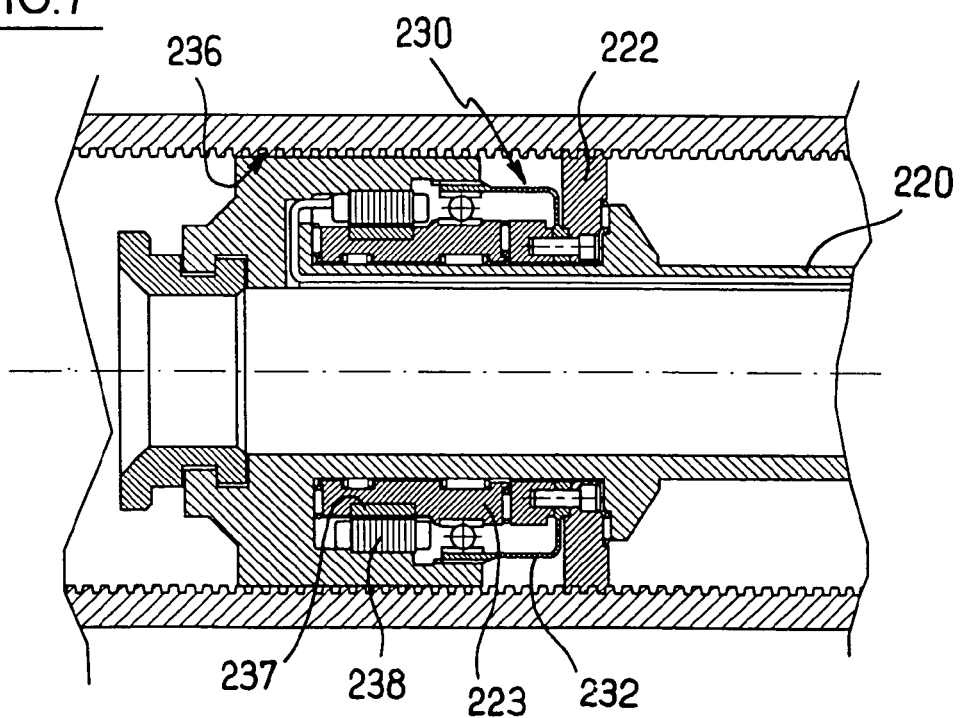

TELESCOPIC ACTUATOR WITH A MAIN ROD AND AN AUXILIARY ROD, AND A METHOD MAKING USE THEREOF

The invention relates to an actuator having a main rod and an auxiliary rod, and to a method making use thereof.

BACKGROUND OF THE INVENTION

Telescopic actuators of the cylinder type are known that comprise a cylinder in which a main rod is mounted to slide along a sliding axis between a retracted position and an extended position.

By way of example, such actuators are used for deploying the landing gear of an aircraft. There exists a (very small) risk of the main rod becoming jammed in the cylinder, such that not only is the actuator prevented from performing its function, but it also prevents movement of the mechanical system in which the actuator is inserted. In particular, in the above-mentioned application, the landing gear would be jammed and could no longer be deployed, which constitutes a safety hazard.

In other fields, telescopic actuators are known that include an auxiliary rod mounted to slide in the main rod along said sliding axis between a retracted position and an extended position. Such actuators serve to give an increased stroke.

OBJECT OF THE INVENTION

The invention seeks to provide an actuator which, even in the event of the main rod jamming, does not oppose continued movement.

BRIEF DESCRIPTION OF THE INVENTION

In order to achieve this object, the invention provides a telescopic actuator comprising a cylinder in which a main rod is mounted to slide along a sliding axis between a retracted position and an extended position, the telescopic actuator including an auxiliary rod mounted to slide telescopically in the main rod along said sliding axis between a retracted position and an extended position. In accordance with the invention, the actuator includes controlled retaining means for retaining the auxiliary rod in the retracted position inside the main rod.

Thus, so long as the main rod slides properly in the cylinder, the auxiliary rod remains blocked in the main rod, and the actuator operates like a conventional actuator. If the main rod becomes jammed, it then suffices to control the retaining means so that they release the auxiliary rod, such that the actuator is again free to lengthen and no longer blocks movement of the mechanical system in which it is inserted.

Thus, unlike prior art telescopic actuators having a main rod and an auxiliary rod, the auxiliary rod of the actuator of the invention is not used for lengthening the stroke of the actuator, but for making it possible to obviate possible jamming of the main rod.

BRIEF DESCRIPTION OF THE DRAWINGS

The invention can be better understood in the light of the following description with reference to the figures of the accompanying drawings, in which:

FIG. 6 is a fragmentary section view of the brake means for braking sliding of the auxiliary rod in the main rod in another particular embodiment;

FIG. 7 is a fragmentary section view of the brake means in a variant embodiment;

DETAILED DESCRIPTION OF THE INVENTION

Figure 1:
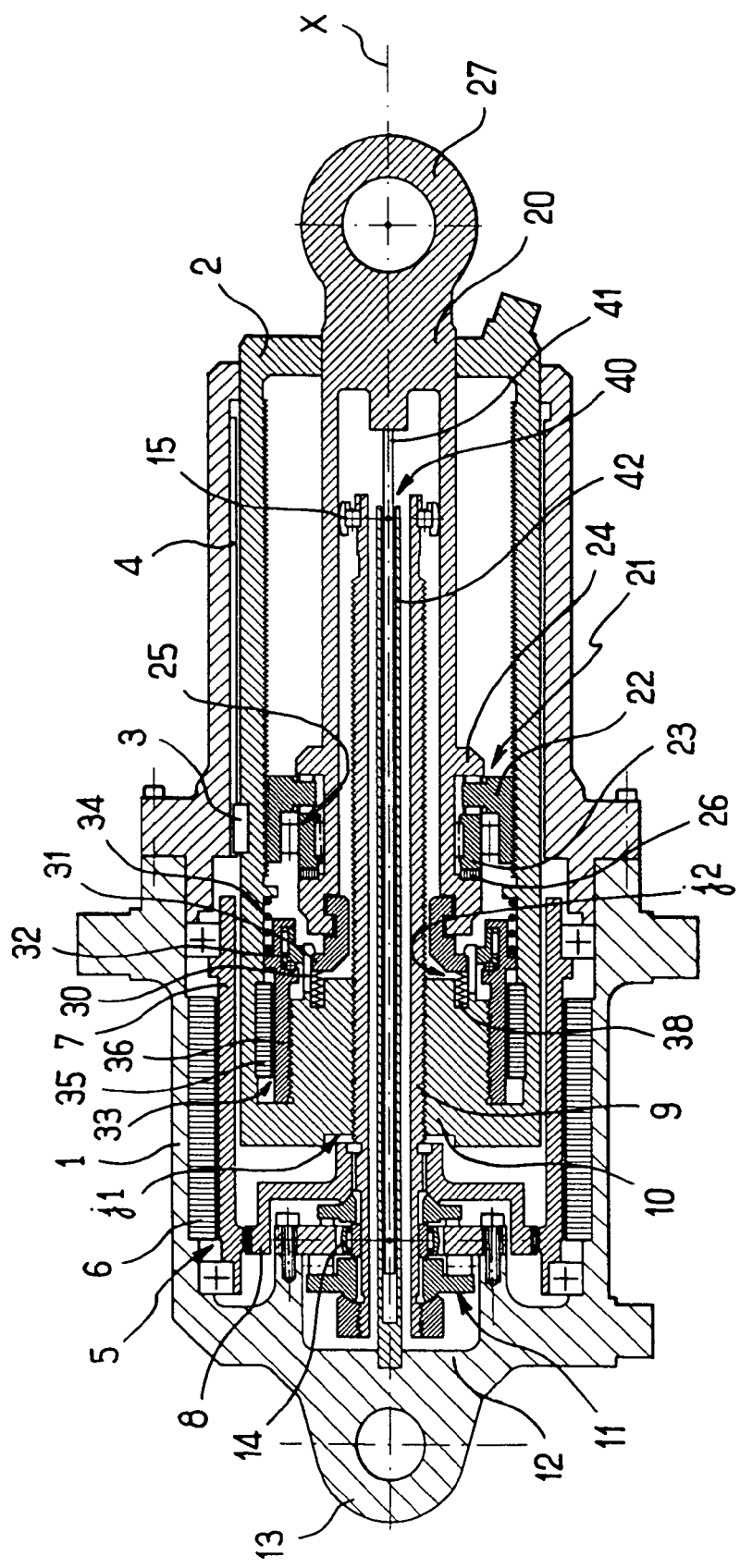
FIG. 1 is a diagrammatic section view of an actuator constituting a particular embodiment of the invention, incorporating controlled means for extending the main rod and brake means for braking sliding of the auxiliary rod in the main rod, the actuator being shown with the main rod and the auxiliary rod in the retracted position.

With reference to FIG. 1, and in a particular embodiment of the invention, the actuator comprises a cylinder 1 defining a cylindrical cavity closed by an end wall 12 carrying a lug 13. A main rod 2 is mounted in the cavity to slide along a sliding axis X and to project to a greater or lesser extent from the cylinder 1 through an open end of the cylinder that constitutes a bearing.

The actuator includes control means for controlling the sliding of the main rod 2 relative to the cylinder 1. These sliding control means comprise:

- a key 3 secured to the main rod 2 and co-operating with a groove 4 formed in the wall of the cavity of the cylinder 1 to prevent the main rod 2 from turning relative to the cylinder 1;
- an electric drive motor 5 comprising a stator 6 mounted stationary in the cylinder 1, and a rotor 7 mounted to rotate inside the cylinder 1 about the axis X;
- a lead screw 9 extending along the axis X and mounted to rotate within the cylinder 1 about the axis X, being driven in rotation by the rotor 7 via a coupler 8. The lead screw 9 is held axially relative to the cylinder 1 by means of a double-acting axial abutment 11; and
- a complementary nut 10 formed in an end wall of the main rod through which the lead screw 9 passes so as to establish a reversible helical connection between the lead screw 9 and the main rod 2.

Thus, rotation of the rotor 7 drives rotation of the lead screw 9 which drives axial displacement of the main rod 2.

The main rod 2 is hollow and defines a cavity in which an auxiliary rod 20 is mounted to slide inside the main rod 2 along the axis X and to project through an open end thereof that forms a bearing.

The actuator includes brake means for braking sliding of the auxiliary rod 20 in the main rod 2 in the direction for extending the auxiliary rod 20. These brake means which also form a bearing 21 for guiding the auxiliary rod 20 in the main rod 2 comprise:

an externally threaded driver 22 that co-operates with internal tapping of the main rod 2 so as to constitute a reversible helical connection between the driver 22 and the main rod 2;

a bushing 23 mounted to rotate on the auxiliary rod 20 by means of rollers, the driver 22 itself being mounted to rotate on the bushing 23 by means of rollers, the driver 22 being held captive axially between the bushing 23 and the rollers bearing against an abutment 24 of the auxiliary rod 20;

a ratchet-type freewheel 25 between the diver 22 and the bushing 23 which, when the auxiliary rod 20 is extended from the main rod 2 and the driver 22 turns because of the helical connection with the main rod 2, causes the bushing 23 to rotate. In contrast, when the auxiliary rod 20 returns into the main rod 2, the driver 22 turns but does not drive the bushing 23 in rotation; and a friction washer 26 carried by the auxiliary rod 20 facing a free face of the bushing 23 and adapted to generate friction against the bushing 23 when it turns by being pressed against the friction washer 23 under external drive pulling on the auxiliary rod 20;

It should be observed that the auxiliary rod 20 is guided axially firstly by the open end of the main rod 2 and secondly by the bearing 21. The main rod 2 is guided axially firstly by the open end of the cylinder 1 and secondly by co-operation between the nut 10 and the lead screw 9. Finally, the lead screw 9 is guided axially at one end by a ball joint 14 inserted in the double-acting abutment 11, and at the other end by a sliding ball joint 15 which is mounted to slide inside the auxiliary rod 20. By means of these dispositions, there is no need to fit the main rod 2 with a sliding bearing inside the cylinder 1.

It should be observed that the auxiliary rod is not prevented from rotating relative to the main rod 2. There is no need to do so providing both the end lug 27 of the auxiliary rod 20 and the lug 13 of the cylinder 1 are both coupled to external elements that are not free to rotate relative to each other or that can turn only a little. It is then the external element that prevents the auxiliary rod 20 from rotating relative to the main rod 2 and relative to the cylinder 1. In a variant, it is desirable to provide internal antirotation means between the auxiliary rod 20 and the main rod 2.

Finally, in an essential aspect of the invention, the actuator further includes controlled retaining means for retaining the auxiliary rod 20 in its retracted position inside the main rod 2. These retaining means comprise:

a catch 30 extending inside the main rod 2;

a step 31 provided at the end of the auxiliary rod 20 and adapted to co-operate with the catch 30; and a locking sleeve 32 that is axially displaceable by an unlocking motor 33 against a return spring 34 from a locking position (shown in this figure) in which it covers the catch 30 so as to prevent it from expanding radially, and a release position in which it leaves the catch 30 free to expand radially when the step 31 passes therethrough.

For this purpose, the unlocking motor 33 comprises a stator 35 secured to the main rod 2, and a rotor 36 that co-operates with a complementary thread of the main rod 2 to constitute a reversible helical connection. Rotation of the rotor 36 thus causes it to move axially. The locking sleeve 32 is carried at the end of the rotor 36 and is mounted thereto by means of rollers so as to be free to rotate.

The operation of the actuator is described below in the particular application to deploying an aircraft undercarriage. It is assumed here that the lug 13 of the cylinder 1 is fastened to the structure of the aircraft, while the lug 27 of the auxiliary rod 20 is coupled to the strut of an undercarriage hinged to the aircraft and movable between a retracted position and a deployed position.

The situation shown in FIG. 1, where the main rod 2 is in the retracted position inside the cylinder 1 and the auxiliary rod 20 is in the retracted position inside the main rod 2 and is held in said position, corresponds to the situation in which the actuator of the invention is to be found when the undercarriage is in the retracted position in its bay.

In order to extend the undercarriage, and in normal operation thereof, the drive motor 5 is initially operated to cause the main rod 2 to reverse inside the cylinder 1. For this purpose, clearance j1 is provided in the retracted position between the end of the main rod 2 and the coupler 8 so that the main rod can be reversed a little beyond its retracted position.

This reversing serves to off-load the catch unit that holds the undercarriage in the retracted position, thereby making it easier to move the hook of the catch unit.

Once the hook has been moved and the undercarriage released, the power supply to the drive motor 5 is switched off so that the undercarriage is lowered under the effect of its own weight, forcing the main rod 2 to be extended. This movement is made possible by the fact that the helical connection between the nut 10 and the lead screw 9 is reversible. In a variant, the drive motor 5 is not switched off, but its power supply is reduced sufficiently to enable the weight of the under-carriage to entrain the main rod against resistance delivered by the drive motor 5. Such resistance makes it possible to have active control over the speed at which the undercarriage is deployed.

Figure 2:
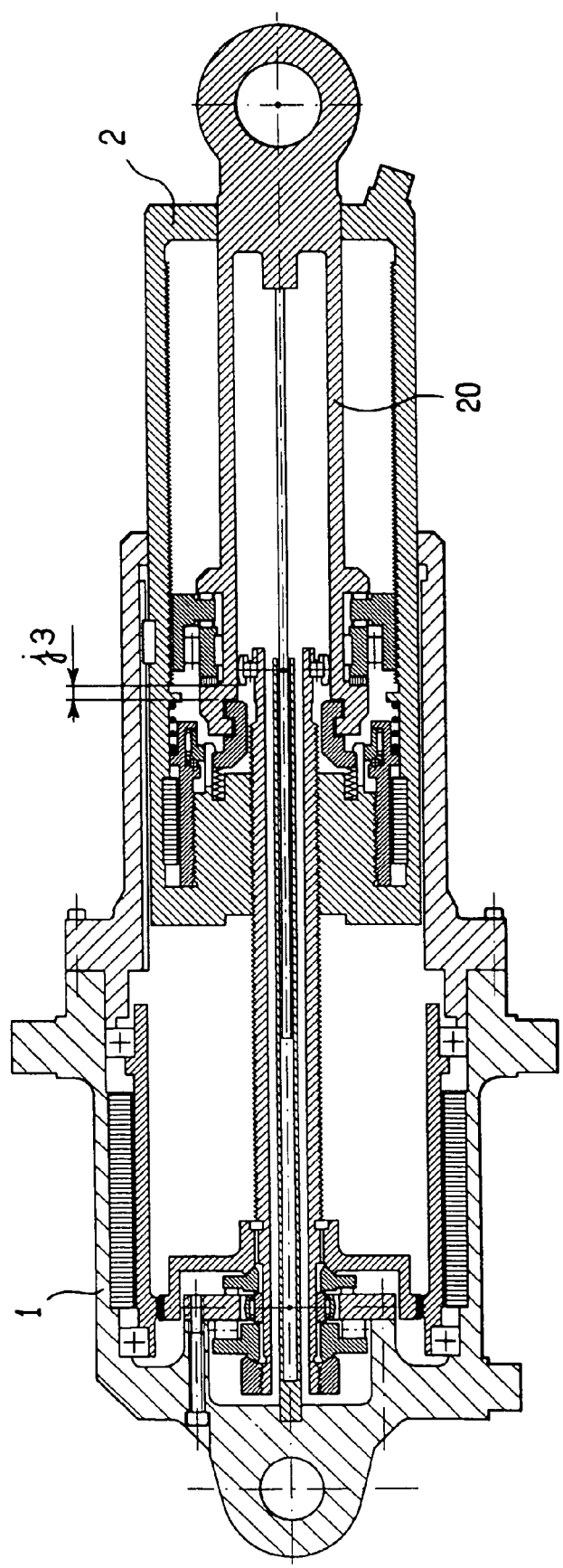
FIG. 2 is a view analogous to FIG. 1 in which the main rod is in the extended position while the auxiliary rod is in the retracted position.

The undercarriage then reaches its deployed position, in which the main rod 2 is in its extended position, as shown in FIG. 2.

It should be observed that such an undercarriage is often stabilized in the deployed position by a sidebrace comprising two hinged arms. It is common practice to make provision for the in-line position of the arms of the sidebrace not to coincide with the deployed position of the undercarriage, but with an extreme position slightly beyond the deployed position, such that the position of the sidebrace in which it is locked for stabilizing the undercarriage is a position beyond the in-line position.

This provision amounts to requiring the under-carriage to move from its retracted position to the extreme position in which the arms of the sidebrace are in line, and then to return a little from the extreme position to the deployed position, the sidebrace then reaching its locking position beyond its in-line position.

The extended position of the actuator shown in FIG. 2 corresponds to the undercarriage being deployed, and therefore does not correspond to the maximum extension position of the rod (which corresponds to the extreme position of the undercarriage). It can be seen in this figure that there is clearance j3 between the portion of the auxiliary rod 20 carrying the step 31 and the sliding ball joint 15 of the lead screw 9, said clearance serving to accommodate the maximally-extended position.

If for any reason, during deployment of the under-carriage, the main rod 2 jams in its maximally-extended position corresponding to the undercarriage being in its extreme position, the actuator then opposes the under-carriage returning from the extreme position to the deployed position, thereby preventing the sidebrace from becoming locked, and thus constituting a safety hazard.

In order to enable the sidebrace to lock, even if the main rod 2 jams in its maximally-extended position, springs 38 are disposed on the main rod 2 to urge the step 31 of the auxiliary rod 20 into abutment against the end teeth of the arms of the catch 30, thus defining the retracted position of the auxiliary rod 20 in the main rod 2. Nevertheless, the springs 38 allow for the possibility of a small amount of retraction (represented by clearance j2) of the auxiliary rod 20 into the main rod 2 against the springs 38. This possibility for retraction enables the undercarriage to move a short distance in return from its extreme position to the deployed position, thereby enabling the sidebrace to be locked.

To cause the main rod 2 to return to the retracted position, it suffices to cause the drive motor 5 to rotate in the opposite direction so as to cause the main rod 2 to be retracted towards its retracted position as shown in FIG. 1.

If for any reason whatsoever, the main rod 2 remains jammed in the retracted position or in an intermediate position, thus preventing the undercarriage from being deployed, it suffices to power the unlocking motor 33 so as to place the locking sleeve 32 in the release position. Under the weight of the undercarriage once it has been released by the hook of the catch unit, the auxiliary rod 20 is pulled out and the step 31 forces the catch 30 to expand radially so as to allow the step 31 to pass through and so that the auxiliary rod is no longer retained but is free to slide. This thus obviates the jamming of the main rod and enables the undercarriage to lengthen once more, thereby avoiding any blocking of the undercarriage in a position that is not the deployed and locked position.

Extending the auxiliary rod 20 forces the driver 22 to rotate and it in turn causes the bushing 23 to rotate, which bushing is braked in its rotation, since it is pressed against the friction ring 26 by the weight of the undercarriage. This braking serves to brake rotation of the driver 22 and thus to brake extension of the auxiliary rod 20. This braking serves to provide passive control over the speed at which the undercarriage is deployed.

Figure 3:
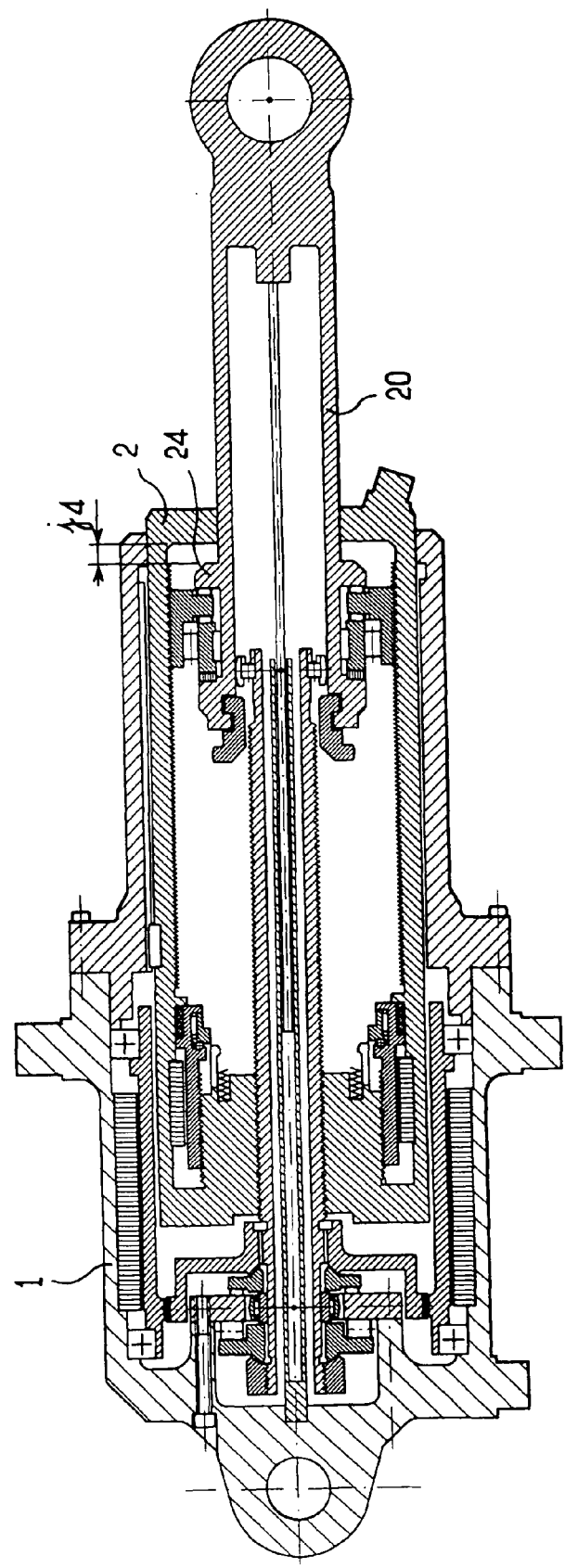
FIG. 3 is a view analogous to FIG. 1 in which the main rod is in the retracted position while the auxiliary rod is in the extended position.

The auxiliary rod 20 extends to the extended position shown in FIG. 3. In the same manner as described above, this extended position corresponds to the undercarriage being in its deployed position, and is not the maximally-extended position of the auxiliary rod. Thus, this figure shows that there is clearance j4 between the abutment 24 and the end of the main rod 2, enabling the maximally-extended position to be accommodated.

Thus, this emergency mode of deployment serves to mitigate the effects of a breakdown of the drive motor 5 or of the main rod 2 jamming.

As a test, it can be advantageous from time to time to deploy the undercarriage in emergency mode, even when the main rod 2 is not jammed. For this purpose, the unlocking motor 33 is powered so as to release the auxiliary rod 20. The undercarriage then moves downwards under its own weight, entraining the auxiliary rod to its extended position as during the emergency deployment mode. It is appropriate to block the main rod 2 axially in position by powering the drive motor 5 in such a manner that the main rod does not extend under friction drive from the auxiliary rod 20. Thereafter, the drive motor 5 is powered so as to extend the main rod 2 until it reaches the position shown in FIG. 2, or a position extended slightly further, as made possible by the springs 38. In this position, the step 31 is reengaged under the catch 30. It then suffices to switch off the unlocking motor 33 so that the sleeve 32 returns under drive from the spring 34 into the locking position where it covers the catch. The auxiliary rod 20 is again coupled to the main rod 2 so that the assembly can be retracted by means of the drive motor 5.

In a particular aspect of the invention, the actuator is fitted with an axial position sensor 40 for sensing the position of the auxiliary rod 20 relative to the cylinder 1. The axial position sensor 40 comprises a core 41 extending along the axis X and secured to the auxiliary rod 20, the core penetrating into a cylinder 42. The sensor is preferably of the induction or linear voltage differential transducer (LVDT) type.

Regardless of whether the actuator is used in normal mode or in emergency mode, the sensor 40 serves at all times to give the position of the auxiliary rod 20 relative to the cylinder 1. In order to know the position of the main rod 2 relative to the cylinder 1, it suffices to count the number of revolutions through which the drive motor 5 has turned.

The invention is not limited to the above description, but on the contrary covers any variant coming within the ambit defined by the claims.

In particular, although it is stated that the helical connection between the lead screw 9 and the nut 10 of the main rod 2 is reversible, this connection could be irreversible, which requires the drive motor 5 to be powered in order to extend the main rod 2. Similarly, although it is stated that the helical connection between the rotor 36 and the main rod 2 is reversible, this connection could be irreversible, which would make it necessary to power the unlocking motor 33 in order to cause the sleeve to return to the locking position.

Although the main rotor 5 drives the lead screw 9 directly via the coupler 8, gearing could be interposed between the drive motor and the lead screw.

Although it is stated that the means for causing the main rod to slide in the cylinder and the means for retaining the auxiliary rod in the main rod are electrically powered, these means could be of some other type, for example they could be hydraulic.

Although the controlled retaining means shown make use of a catch and step system, the controlled retaining means could be some other type for example using a locking finger or segment.

In addition, means could be provided for controlling the sliding of the auxiliary rod inside the main rod.

Figure 4:
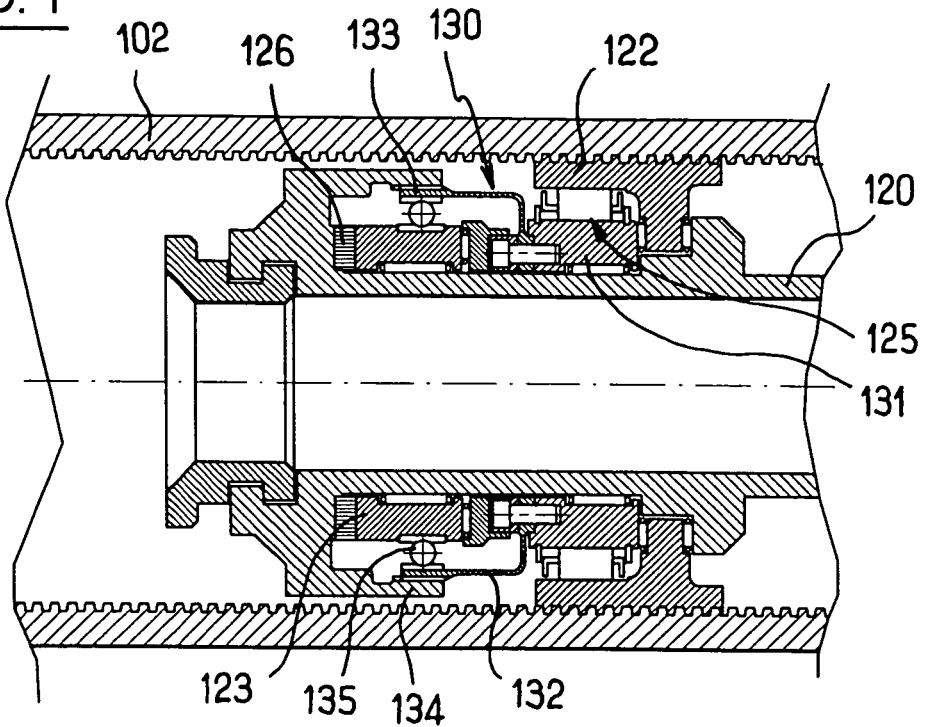
FIG. 4 is a fragmentary section view of the brake means for braking sliding of the auxiliary rod in the main rod, in one variant embodiment.

Finally, braking of the auxiliary rod 20 relative to the main rod 2 can be implemented in various ways, such as those shown in FIGS. 4 et seq.

In a first variant shown in FIG. 4, in which the references for elements that are common with the preceding figures are increased by one hundred, the bushing 123 is no longer driven directly by the driver 122, but via speed-increasing gearing 130. In this example, the gearing 130 is constituted by reversible speed-reducing gearing of the type shown in U.S. Pat. No. 2,906,143, but used in reverse, i.e. as a speed increaser and not as a speed reducer.

The speed-increasing gearing 130 comprises an inlet ring 131 guided in rotation on the auxiliary rod 120 and rotated by the driver 122 via a freewheel 125. The inlet member 131 is secured to a bell 132 having a deformable circular wall 133 carrying on its outer face teeth that co-operate with facing teeth of a toothed ring 134, and in slightly greater number. The toothed ring 134 is secured to the auxiliary rod 120 and is therefore prevented from rotating.

Co-operation between the teeth of the bell 132 and the teeth of the ring 134 is provided by the deformable circular wall 133 deforming under the effect of balls received in a ball race of elliptical section formed in the busing 123, forcing the teeth to co-operate in two diametrically-opposite portions. The bushing 123 thus forms the outlet member of the speed-increasing gearing 130. The gearing is well known in itself and does not form part of the invention as such. It should be observed that such gearing uses an arrangement that is very compact and lightweight, and makes it possible to obtain speed ratios that are very high, of the order of about one hundred.

Thus, when the auxiliary rod 120 is driven to extend from the main rod 102, the driver 122 drives rotation of the inlet member 131 which drives the bell 132, thereby causing the bushing 123 to rotate at a speed of rotation that is much greater than the speed of rotation of the driver 122. The bushing 123 is forced axially against the friction washer 126 and thus rubs thereagainst, thereby contributing to slowing down the speed at which the auxiliary rod 120 is extended.

In contrast, when the auxiliary rod 120 is forced to retract into the main rod 102, the freewheel 125 prevents the rotary movement of the driver 122 being transmitted to the gearing 130, and thus to the bushing 123, such that the bushing does not oppose any resistance to retraction of the auxiliary rod 120.

The gearing 130 serves to cause the bushing 123 to rotate much more quickly than in the embodiment shown in FIGS. 1 to 3, thus making it possible to obtain the same force opposing advance, while diminishing the friction torque between the bushing 123 and the friction washer 126.

Figure 5:
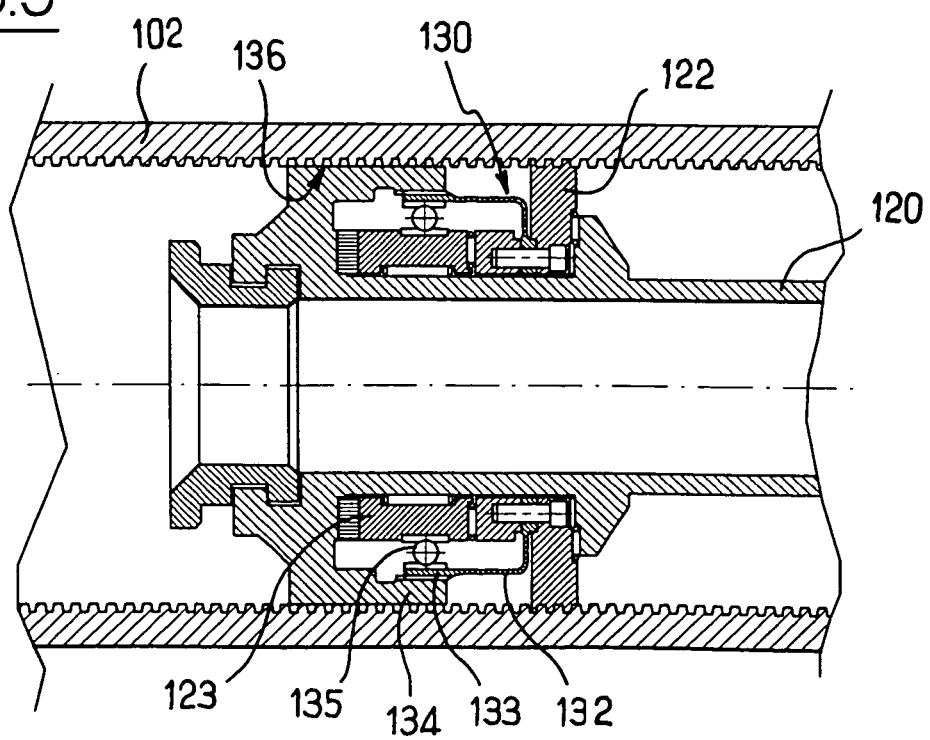
FIG. 5 is a fragmentary section view of the brake means in another variant embodiment.

FIG. 5 shows a variant that is very similar to the above variant, apart from two differences. The first difference lies in omitting the freewheel 125 and the inlet member 131, such that the bell 132 is secured directly on the driver 122. Thus, during retraction of the auxiliary rod 120 into the main rod 102, it is accepted that there will be a force opposing the movement of the auxiliary rod 120. Nevertheless, it should be observed that the opposing force in the retraction direction is normally weaker than the opposing force in the extension direction, since during retraction the bushing 123 is not pushed against the friction washer 126.

The second difference lies in the fact that the driver 122 no longer forms a bearing for guiding the auxiliary rod 120. The bearing function is now provided by a bearing surface 136 formed on one end of the auxiliary rod 120 so as to bear against the tips of the threads constituting the internal tapping of the auxiliary rod 120. The driver 122 is thus reduced to performing its function of applying rotary drive to the mechanism that generates the opposing force.

Another variant is shown in FIG. 6 where the references of elements in common with those shown in FIGS. 4 and 5 are increased by another one hundred. There can be seen the driver 222, the gearing 230 with its inlet member 231 constrained to rotate with the driver via a freewheel 225, its bell 232, and its stationary toothed ring 234. The bushing 223 that forms the outlet member of the gearing does not rub against a friction washer but carries permanent magnets 237 disposed circumferentially facing a winding 238 mounted in stationary manner on the auxiliary rod 220.

Thus, when the bushing 223 is driven in rotation at high speed while the auxiliary rod 220 is extending, the rotating permanent magnets 237 induce current in the winding 238, and it suffices to pass that current through an electrical resistance (not shown) to generate an opposing electromagnetic force on the bushing 223, thereby braking its rotation. The extension of the auxiliary rod 220 is thus braked electromagnetically. The braking force can be controlled electronically so as to cause the resistance into which the winding 238 delivers the induced current to vary electronically. In particular, it is easy to generate an opposing force that depends on the speed at which the auxiliary rod 220 is extending.

FIG. 7 shows a variant that is very similar to that shown in FIG. 6, apart from two differences. The first difference lies in omitting the freewheel 225 and the inlet member 231, such that the bell 232 is secured directly to the driver 222. Although the freewheel is omitted, so that the bushing 223 turns both while the auxiliary rod is extending and while it is retracting, an opposing force is not necessarily generated during retraction of the auxiliary rod. It suffices to open the circuit into which the winding 238 delivers current to eliminate any opposing electromagnetic force. On the contrary, by injecting power supply current into the winding 232, it is even possible to create a driving electromagnetic force that assists retraction of the auxiliary rod 220. The same member can thus serve both as a brake during extension of the auxiliary rod 220, and as a motor for retracting it.

The second difference lies in the fact that the driver 222 no longer forms a guide bearing for the auxiliary rod 220. The bearing function is now provided by a bearing surface 236 made on one end of the auxiliary rod 220 so that it bears against the tips of the threads constituting the internal tapping of the auxiliary rod 220. Thus, the driver 222 is used here solely for its function of applying rotary drive to the mechanism for generating an opposing force.

Figure 8:
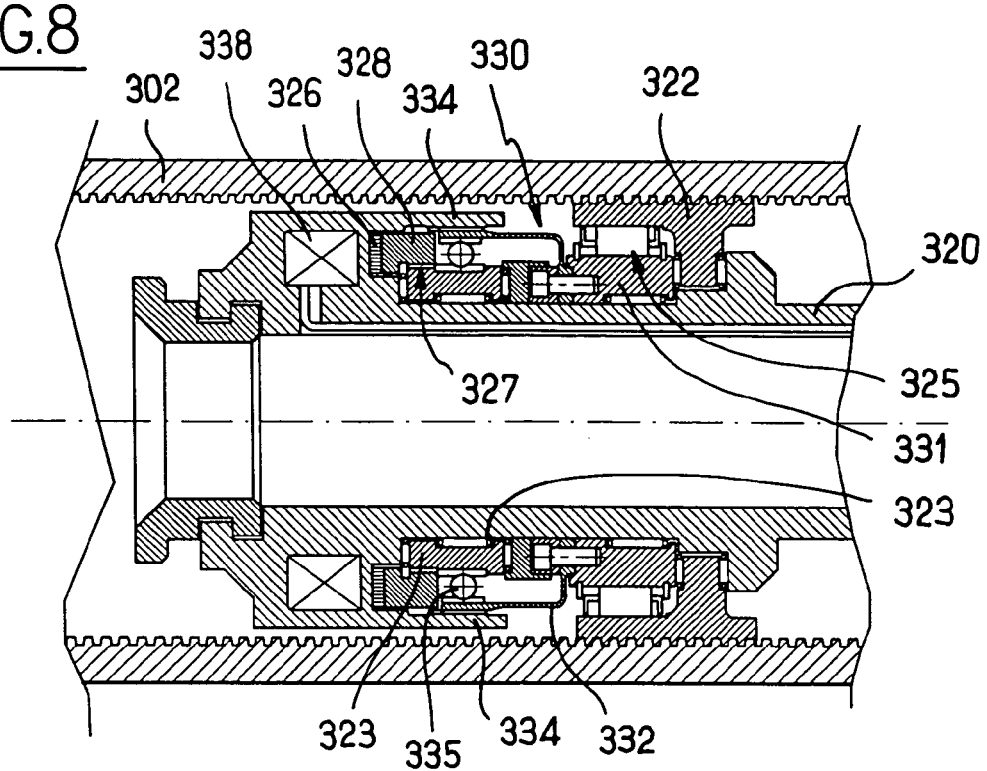
FIG. 8 is a fragmentary section view of the means for braking sliding of the auxiliary rod in the main rod in yet another embodiment.

Another variant is shown in FIG. 8 where the references of elements in common with those shown in FIGS. 6 and 7 are increased by another hundred. There can be seen the driver 322, the gearing 330 with its inlet member 331 constrained to rotate with the driver by means of a freewheel 325, its bell 332, and its stationary toothed ring 334. The bushing 323 that forms the outlet member of the gearing has fluting 327 at its end co-operating with complementary fluting of a jaw 328 that is in the form of a sleeve of ferromagnetic material. The jaw 328 is axially displaceable under drive from an electromagnet 338 mounted stationary relative to the auxiliary rod 320 so as to pinch a brake washer 326 mounted stationary relative to the auxiliary rod 320.

Thus, when the bushing 323 is driven in rotation at high speed while the auxiliary rod 320 is extending, the jaw 328 is itself rotated at the same speed. It suffices to power the electromagnet 338 electrically to attract the jaw 328 against the friction washer 326 so that the jaw 328 rubs against the friction washer 326 and an opposing force is generated. This braking force can be controlled electronically by electronically varying the power supply current fed to the electromagnet 338 so that the jaw 328 is attracted with greater or lesser force against the friction washer 326. In particular, it is easy to generate an opposing force that depends on the speed at which the auxiliary rod 320 is being extended.

When the auxiliary rod 320 retracts into the main rod 302, the freewheel prevents the bushing 323 from rotating and thus prevents the jaw 328 from rotating, thereby eliminating friction between the jaw 328 and the friction washer 326, even if the electromagnet 338 continues to be powered.

Figure 9:
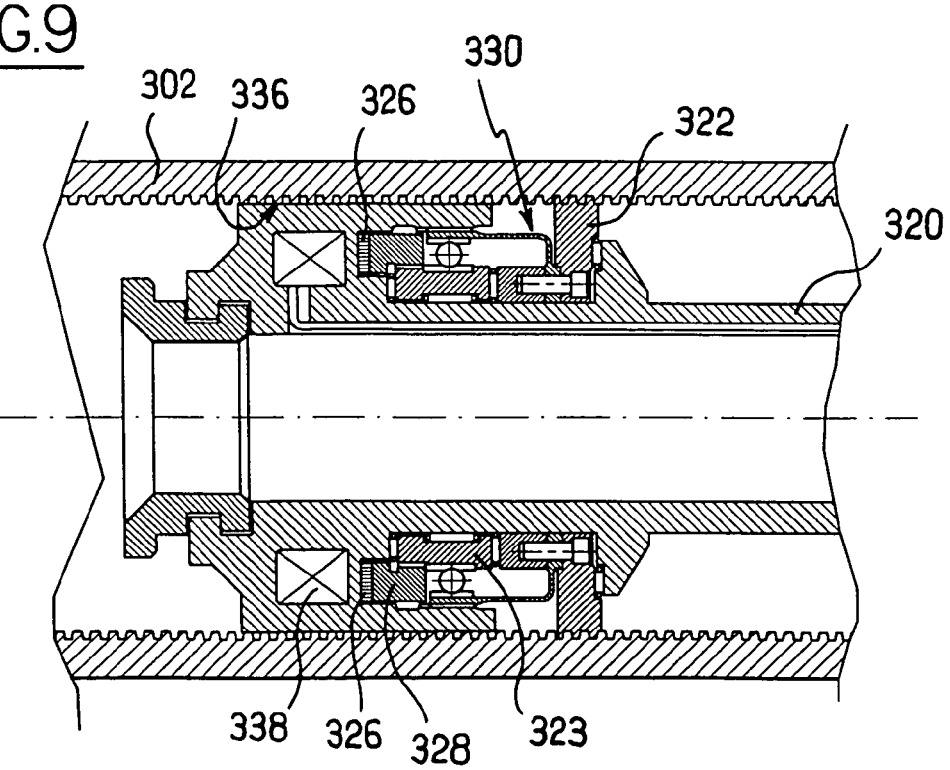
FIG. 9 is a fragmentary section view of the brake means in a variant embodiment.

FIG. 9 shows a variant very similar to that shown in FIG. 8, apart from two differences. The first difference lies in omitting the freewheel 325 and the inlet member 331, so that the bell 332 is secured directly to the driver 322. Although the freewheel is omitted, so the bushing 323 rotates both while the auxiliary rod is extending and while it is retracting, an opposing force is not necessarily generated during retraction of the auxiliary rod. It suffices to cease powering the electromagnet 338 to ensure that the jaw is no longer attracted against the friction washer 326 and can therefore no longer an opposing force.

The second difference lies in the fact that the driver 322 no longer forms a guide bearing for the auxiliary rod 320. The bearing function is now provided by a bearing surface 336 formed on one end of the auxiliary rod 320 so as to bear against the tips of the threads constituting the internal tapping of the auxiliary rod 320. The driver 322 is thus used here solely for its function of delivering rotary drive to the mechanism for generating the opposing force.

What is claimed is:

1. A telescopic actuator comprising a cylinder in which a main rod is mounted to slide telescopically along a sliding axis X between a retraced position and an extended position, the telescopic actuator including an auxiliary rod mounted to slide telescopically in the main rod along said sliding axis between a retracted position and an extended position, the actuator including controlled retaining means carried by the main rod and by the auxiliary rod for retaining the auxiliary rod in the retracted position inside the main rod, and wherein said retaining means are carried by the main rod and by the auxiliary rod, and comprises controlled sliding means for controlling sliding of the main rod in the cylinder, said controlled sliding means comprising:
   a motor member;
   a lead screw extending along the sliding axis and rotatably mounted on the cylinder so as to be driven in rotation by the motor member;
   a nut secured to the main rod and co-operating with the lead screw; and
   antirotation means for preventing the main rod from rotating relative to the cylinder,
   and in which the lead screw has one end guided by a first ball joint mounted on the cylinder, and another end guided by a second ball joint slidably mounted in the auxiliary rod.

2. An actuator according to claim 1, in which the controlled retaining means comprises:
   a catch carried by the main rod;
   a step carried by the auxiliary rod to co-operate with the catch; and
   a lockable sleeve carried by the main rod and displaceable axially between a release position in which the sleeve leaves the catch free to deform radially under the effect of a step of the auxiliary rod going past it, and a locking position in which the sleeve prevents the catch from deforming radially, the catch then co-operating with the step to define the retracted position of the auxiliary rod.

3. An actuator according to claim 1, in which the controlled retaining means comprise a resilient member adapted to hold the auxiliary rod pressed against a retractable axial abutment of said controlled retaining means defining the retracted position of the auxiliary rod, while allowing the auxiliary rod to retract a little into the main rod beyond its retracted position.

4. An actuator according to claim 1, in which the lead screw is prevented from moving axially relative to the cylinder by a double-acting axial abutment.

5. An actuator according to claim 1, including a sensor for sensing displacement of the auxiliary rod relative to the cylinder.

6. A method of using an actuator according to claim 1, the method comprising the step of causing the actuator to operate:
   either in a normal mode in which the retaining means are controlled to retain the auxiliary rod in the retracted position inside the main rod;
   or else, at least under circumstances in which the main rod is jammed in the cylinder, in an emergency mode in which the retaining means are controlled to cease retaining the auxiliary rod in the retracted position.

7. An actuator according to claim 1, including sliding brake means for braking the sliding of the auxiliary rod in the main rod in the extension direction.

8. An actuator according to claim 7, in which the brake means comprise:
   a driver co-operating with the main rod via a reversible helical connection having the sliding axis as its axis so that the driver rotates when the auxiliary rod slides in the main rod;
   a bushing mounted to rotate on the auxiliary rod about the sliding axis on being driven in rotation by the driver, at least while the auxiliary rod is extending from the main rod, the bushing carrying permanent magnets; and
   a winding mounted stationary on the auxiliary rod with which the permanent magnets carried by the bushing interact electromagnetically while the bushing is being driven in rotation by the driver.

9. An actuator according to claim 7, in which the brake means comprise:
   a driver co-operating with the main rod via a reversible helical connection having the sliding axis as its axis so that the driver rotates when the auxiliary rod slides in the main rod;
   a bushing mounted to rotate on the auxiliary rod about the sliding axis on being driven in rotation by the driver, at least while the auxiliary rod is extending from the main rod, a jaw being mounted to move axially on the bushing; and
   an electromagnet mounted stationary on the auxiliary rod to attract the jaw selectively so that the jaw rubs against a friction member mounted stationary on the auxiliary rod when the bushing is driven in rotation by the driver.

10. An actuator according to claim 7, in which the brake means comprise:
    a driver co-operating with the main rod via a reversible helical connection having the sliding axis as its axis so that the driver rotates when the auxiliary rod slides in the main rod;
    a bushing mounted to rotate on the auxiliary rod about the sliding axis on being driven in rotation by the driver, at least while the auxiliary rod is extending from the main rod; and
    a friction member mounted on the auxiliary rod and against which the bushing rubs while it is being driven in rotation by the driver.

11. An actuator according to claim 10, in which the brake means further comprise rotary speed-increasing gearing disposed between the driver and the bushing so that the bushing rotates faster than the driver.

12. An actuator according to claim 10, in which the driver forms a bearing for the auxiliary rod in the main rod.

13. A telescopic actuator comprising:
    a cylinder in which a main rod is mounted to slide telescopically along a sliding axis X between a retraced position and an extended position,
    an auxiliary rod mounted to slide telescopically in the main rod along said sliding axis between a retracted position and an extended position,
    controlled retaining means carried by the main rod and by the auxiliary rod for retaining the auxiliary rod in the retracted position inside the main rod, wherein said retaining means are carried by the main rod and by the auxiliary rod, and the controlled retaining means comprise:
    a catch carried by the main rod;
    a step carried by the auxiliary rod to co-operate with the catch; and
    a lockable sleeve carried by the main rod and displaceable axially between a release position in which the sleeve leaves the catch free to deform radially under the effect of a step of the auxiliary rod going past it, and a locking position in which the sleeve prevents the catch from deforming radially, the catch then co-operating with the step to define the retracted position of the auxiliary rod.

14. A telescopic actuator comprising:

a cylinder in which a main rod is mounted to slide telescopically along a sliding axis X between a retraced position and an extended position, an auxiliary rod mounted to slide telescopically in the main rod along said sliding axis between a retracted position and an extended position, controlled retaining means carried by the main rod and by the auxiliary rod for retaining the auxiliary rod in the retracted position inside the main rod, wherein said retaining means are carried by the main rod and by the auxiliary rod, and sliding brake means for braking the sliding of the auxiliary rod in the main rod in the extension direction, the sliding brake means comprising:

a driver co-operating with the main rod via a reversible helical connection having the sliding axis as its axis so that the driver rotates when the auxiliary rod slides in the main rod;

a bushing mounted to rotate on the auxiliary rod about the sliding axis on being driven in rotation by the driver, at least while the auxiliary rod is extending from the main rod; and a friction member mounted on the auxiliary rod and against which the bushing rubs while it is being driven in rotation by the driver.

15. An actuator according to claim 14, in which the brake means comprise:

a driver co-operating with the main rod via a reversible helical connection having the sliding axis as its axis so that the driver rotates when the auxiliary rod slides in the main rod;

a bushing mounted to rotate on the auxiliary rod about the sliding axis on being driven in rotation by the driver, at least while the auxiliary rod is extending from the main rod, a jaw being mounted to move axially on the bushing; and an electromagnet mounted stationary on the auxiliary rod to attract the jaw selectively so that the jaw rubs against a friction member mounted stationary on the auxiliary rod when the bushing is driven in rotation by the driver.

16. An actuator according to claim 14, in which the brake means further comprise rotary speed-increasing gearing disposed between the driver and the bushing so that the bushing rotates faster than the driver.

17. An actuator according to claim 14, in which the driver forms a bearing for the auxiliary rod in the main rod.

* * * * *